United States Patent [19]

Sticht

[11] Patent Number: 4,681,043
[45] Date of Patent: Jul. 21, 1987

[54] MODULAR MACHINE TABLE FOR PRODUCTION PLANTS

[76] Inventor: Walter Sticht, Karl-Heinrich-Waggerl-Strasse 8, A-4800 Attnang-Puchheim, Austria

[21] Appl. No.: 695,842

[22] Filed: Jan. 28, 1985

[30] Foreign Application Priority Data

Feb. 6, 1984 [AT] Austria .................................. 366/84

[51] Int. Cl.⁴ .............................................. A47B 3/06
[52] U.S. Cl. ..................................... 108/153; 108/64; 108/114; 108/104; 312/196; 312/209
[58] Field of Search ................... 108/153, 64, 104, 20; 29/564, 59; 211/189; 269/55, 56, 58, 71; 312/196, 209; 248/188

[56] References Cited

U.S. PATENT DOCUMENTS

| | | | |
|---|---|---|---|
| 971,707 | 10/1910 | Waters | 108/114 |
| 2,527,902 | 10/1950 | Wessig | 108/64 |
| 2,536,937 | 1/1951 | Hosea | 108/104 X |
| 2,678,489 | 5/1954 | Ratzlaff et al. | 312/196 |
| 2,905,334 | 9/1959 | Gottschalk et al. | 108/64 X |
| 2,972,506 | 2/1961 | Haag | 108/64 |
| 3,041,957 | 7/1962 | Liptay | 312/209 X |
| 3,243,178 | 3/1966 | Williamson et al. | 269/58 |
| 3,261,307 | 7/1966 | Salkoff | 108/64 |
| 3,327,657 | 6/1967 | Hauville | 108/153 |
| 3,393,648 | 7/1968 | Diehr | 108/137 X |
| 3,485,189 | 12/1969 | Marco | 108/64 |
| 3,988,014 | 10/1976 | Worden | 269/71 |
| 4,132,455 | 1/1979 | Binoth | 108/104 X |
| 4,449,277 | 5/1984 | Hasegawa | 269/56 X |
| 4,553,674 | 11/1985 | Yoshikawa et al. | 211/189 X |

*Primary Examiner*—Peter A. Aschenbrenner
*Attorney, Agent, or Firm*—Kurt Kelman

[57] ABSTRACT

A modular machine table comprises a pair of vertical plate-like support components interconnected via horizontal transverse struts by releasable coupling devices and supporting a table plate secured by releasable coupling devices. The plate-like components are suitably of channel form and are provided with adjustable lower supports and with bores in the web for receipt of coupling means for joining adjacent tables and in the flange for mounting of a safety module or the like. The table plate is formed with bores and recesses for mounting guiding drive, coding and positioning modules and with a pattern of bores and/or slots for locating and mounting working devices. In one embodiment a table plate is provided with a turntable and two sets of guide modules intersecting at the turntable whereby a workpiece carrier may be displaced from one to another guide path. The plate-like components are arranged flush with edges of the table plates so that the plate-like components of adjacent tables may be abutted.

Common parts are used for the construction of different tables in readily dissemblable manner, which are of high rigidity and which by virtue of their modular nature allow flexible arrangement of a production line.

9 Claims, 11 Drawing Figures

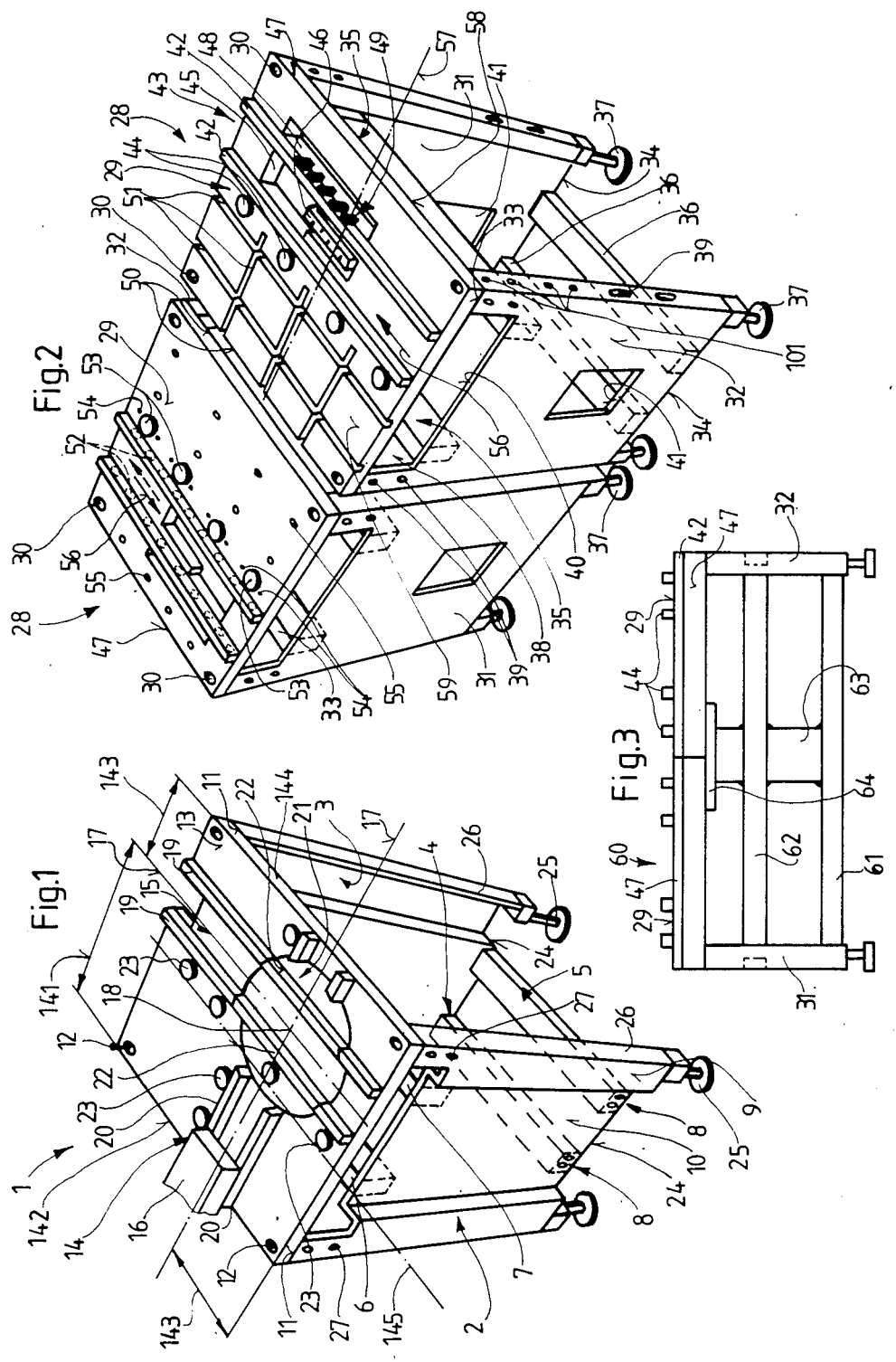

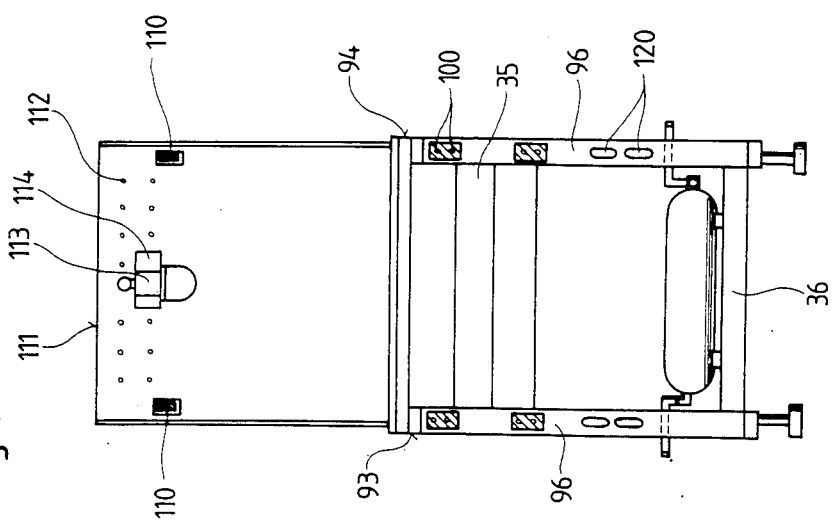
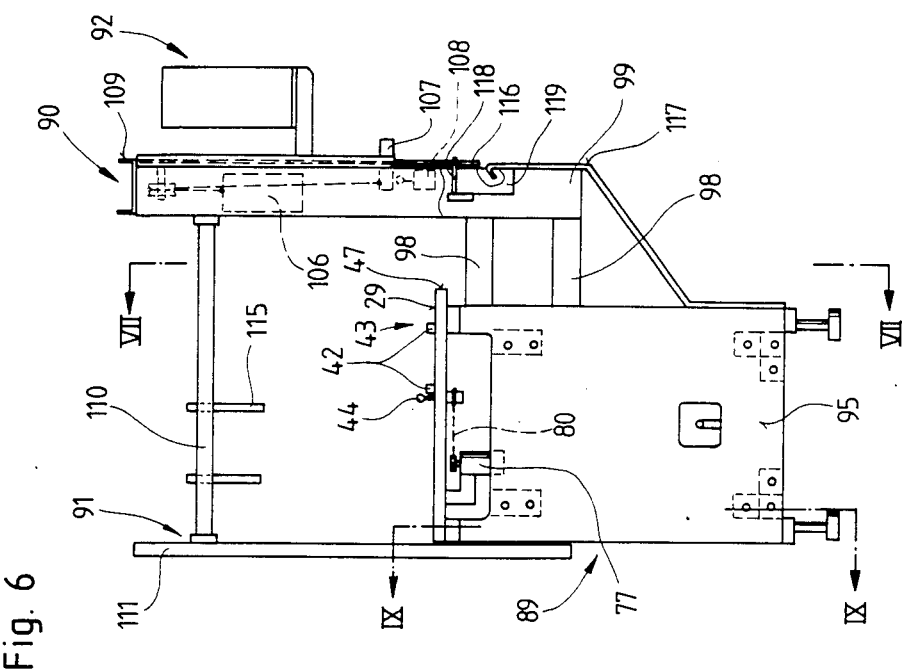

MODULAR MACHINE TABLE FOR PRODUCTION PLANTS

BACKGROUND OF THE INVENTION

The invention relates to a modular machine table for production plants, in particular for a plant for the production of components comprising several individual elements, which comprises vertically extending support elements, horizontally extending transverse struts connecting these elements and coupling means for releasable coupling of adjacently situated machine tables.

Machine tables which are interchangeable and connectible by means of like coupling devices are known from published German patent application No. 2,756,422. One or more guiding tracks for workpiece carriers may be installed on these machine tables. The feed device in the case of these machine tables is formed by friction roller drives situated at the sides of the guiding tracks.

Production systems comprising several consecutively joined machine tables are also known from published German application No. 21 06 595. These tables have conveyor track sections and may be coupled to each other in a sequence corresponding to the production programme in question by means of coupling members of like structure to form an integrated production system. The machine tables are frame structures and have to be built massively to bear the various stresses. The massive structure implies considerable weight and the machine tables are very bulky in cartage.

OBJECTS AND SUMMARY OF THE INVENTION

The present invention has the fundamental object of devising massive machine tables which may be assembled in an uncomplicated manner into a production plant comprising a continuous feed and guiding device for workpiece carriers. Furthermore, uncomplicated assembling and dismantling of the machine tables should be possible.

This problem is solved by using as the vertical support elements two plate-shaped support elements interconnected by the horizontally extending transverse struts, the plate-shaped support elements having upper end faces arranged in a plane extending to the transverse struts. A self-supporting table plate is secured to the end faces by means of releasable coupling devices. Releasable coupling devices also connect the plate-shaped support elements and the transverse struts. Thanks to the solution according to the invention, the machine tables may be assembled in the manner of a building set from few and largely identical parts in an unexpectedly uncomplicated manner. Thanks to utilising the plate-shaped support elements connected by the transverse struts, and to utilising a table plate constructed in a self-supporting manner, a machine table having a high degree of torsional rigidity and stability is obtained. At the same time, the space situated beneath the table plate is fully accessible even with several machine tables strung together and may be utilised for incorporation of compressed air supply systems or the like.

According to another important feature of the invention, the plate-shaped support elements have a channel-shaped cross-section plate and have bores for reception of the releasable connecting means for the transverse struts or the connecting means for other machine tables.

A very rigid machine table is produced by constructing the support elements with a channel-shaped cross-section, and identical plate-shaped support elements may be used thanks to the bores which are situated symmetrically with respect to the centre line of the section and intended for the connecting means for the transverse struts or securing adjacent tables together.

Advantageously anchoring plates are placed in the ends of the sections in the transitional area between the flanges and the web, which are equipped with bores extending parallel to the central longitudinal axis of the section and intended to receive displaceable supports or for reception of the means of connection between the table plate and the plate-shaped support elements. A rigid connection with the self-supporting table plate as well as a reliable support system for the machine table are secured thereby in the regions reinforced by the shape imparted to the components.

Suitably the transverse struts are formed by hollow sections with anchoring members arranged in opposite ends thereof, the anchoring members registering with bores formed in the plate-shaped support elements or in support members associated therewith and receiving the coupling means between the plate-like components and the transverse struts, thereby securing an angularly correct connection of high strength between the components and the transverse struts.

The plate-shaped support elements may suitably have a recess formed in the web in the upper end facing the table plate, and the transverse struts are situated below the lower edge of this recess, two other transverse struts being provided at the lower end of the plate-shaped support elements remote from the recess, whereby a spatial framework is formed and access in the area right beneath the table plate is possible in an uncomplicated manner.

It is advantageous furthermore, for the plate-shaped support elements to have perforations formed in them between the transverse struts, for leading through supply and/or coupling lines, so that the supply connections may be led within the production plant even in the case of production plants assembled from several machine tables.

In accordance with the invention, the flanges of the plate-shaped support elements are suitably formed with bores for reception of means for coupling a safety and installaton module thereto, whereby reinforced parts of the components may be utilised to support the safety and installation module, so that the machine tables are additionally reinforced by the connection of several machine tables and by installing the safety and installation modules.

Suitably moreover according to the invention, the flanges and webs of the plate-shaped support elements terminate flush with the edges of the table plates, thereby assuring a reliable and smooth contact of the table plate even in the area of the edges.

It is advantageous if the plate-shaped support elements have a channel-shaped cross-section parallel to the table plate, and a central channel-shaped depression formed by the web between and on the same side as the flanges, in particular for reception of protruding parts of the connecting means for the transverse struts. This renders it possible to bring the edges and plate-shaped support elements of two adjacent machine tables into direct contact without the incorporation of extra support parts and without recessing the screws forming the coupling device.

Provision is made according to another embodiment of the invention for the table plate to be equipped with bores for reception of the fastening means for guiding modules formed by guiding bars and for drive modules and their fastening devices as well as with recesses for incorporation of coding modules and positioning modules, and preferably both surfaces of the table are machined and have a symmetrical pattern of bores at either side of a central axis extending at right angles to the guiding bars. The forming of the bores and perforations during the production of the table plate allows for a high precision so that the co-ordination of the individual modules to be installed on the table plate is possible with speed and ease. Furthermore, thanks to machining both surfaces, it is possible to utilise the table plates for plants running anticlockwise or clockwise, that is to say symmetrically.

Another embodiment of the invention provides that the table plate be equipped with bores situated parallel to a longitudinal edge and eccentrically with respect to a central longitudinal axis of the table plate and adapted to receive guiding and drive modules, and the plate having a greater length in the longitudinal direction of the guiding bars of the guiding modules than at right angles thereto. Thanks to this construction, the table plate may be utilised for both fully automatic assembling stations equipped for example with screw-cutting machines, rivetting machines and the like, in which connection it is possible thanks to the intimate coordination of the guiding bars with one longitudinal edge of the table plate to maintain an ergonomically favourable position even in the case of manual working whilst on the other hand leaving enough space at the one side of the guiding bars for mounting handling apparatus or processing machines and for mounting and securing drive mechanisms at the side of the guiding bars opposed to the former.

The table plate suitably has bores arranged symmetrically with respect to a diagonal of the plate and intended for drive modules and guiding bars of two guiding modules intersecting each other eccentrically of the plate, and for a circular perforation to be formed in the table plate centrically with respect to the point of intersection of the guiding bars, an analogous pattern of bores preferably being present on both surfaces of the table plate. Machine tables equipped with rectilinear guiding bars may thereby be connected in any optional position to the guiding bars of the guiding modules intersecting each other.

According to another embodiment of the invention, provision is made for the circular perforation in the table plate to be arranged for reception of a roller bearing for a rotary plate or turntable having a section of the guiding bars of the guiding module arranged on it, whereby a deflection of the workpiece carriers guided on the guiding bars of the guiding modules is possible in a space-saving manner.

It is advantageous moreover for the table plate to be equipped with reception bores for optional fastening of a rotary drive for the turntable or of a rotary drive for the drive module and for pivoting stops, since this allows the table plates to be interchanged and the rotary drive to be installed rapidly.

Provision is made according to another embodiment of the invention for a safety module to be formed by vertical columns which are jointed by brackets or cantilevers to the flanges of the plate-like components and to be connected above the table plate by transverse beams to a rear plate of the installation module which, for its part, is connected to the branches of the plate-like components which are situated opposite to the cantilevers. Optimum accessibility of the individual machine tables is assured and the parts needed for accident prevention are adapted for repeated utilisation thanks to this uncomplicated frame structure.

In accordance with the invention, it is also possible for the transverse beams to be formed for reception of additional mounting plates of the installation module, and for the mounting plates and rear plates to be equipped with a grid of holes for reception of control and monitoring elements, thereby allowing a neat positioning of control elements as well as rapid assembling.

Provision is made according to another embodiment of the invention for each of the two columns of the accident prevention module to comprise longitudinal guiding bars for reception of a displaceable protective safety plate which is transparent, and for the safety plate to be joined by deflecting pulleys and cable pulls to counterweights running within the columns, the safety plate engaging limit switches in a closed bottom end position whereby a rapid and reliable operation of the safety plate as well as rapid access to the machine are assured.

Suitably further safety plates are situated in the gap between the bottom edge of the displaceable safety plate and the lower transverse struts of the machine table and for one further safety plate to extend from the bottom cantilever of the safety module as far as the bottom extremity of the displaceable safety plate and for another further safety plate to extend between the bottom cantilever and the bottom transverse struts, the sheathing situated between the bottom cantilever and the underside of the protective sheathing plate being releasably connected to the columns or cantilevers by means of quick-release fasteners. Advantageously this embodiment provides satisfactory noise damping as well as safety protection against inadvertent contact.

It is advantageous if the table plate having the circular perforation for the turntable is made square and the length of the side corresponds to the length of the table plate formed to bear a rectilinear guiding device in the direction of the transverse struts the width of this table plate being smaller than the length extending in the direction of the transverse struts, so that production plants may be assembled by means of two different embodiments of machine tables.

It is finally also possible in accordance with the invention for the central longitudinal axis of the guiding module to be situated parallel to one longitudinal lateral edge of the table plate and close to the same, thereby providing a greater area for installation of handling devices.

BRIEF DESCRIPTION OF THE DRAWINGS

The invention will now be described by way of example with reference to the accompanying partly diagrammatic drawings, in which:

FIG. 1 shows a modular machine table provided with two intersecting guiding modules and a turntable, FIG. 2 shows two similar modular machine tables, each provided with a rectilinear guiding module, FIG. 3 is a side elevation of a machine table, intended for a manual work station in a production plant comprising modular machine tables, FIG. 6 is an end elevation of a modular machine table provided with an installation and safety module, FIG. 7 is a partly sectional view taken on the line VII—VII of FIG. 6.

DETAILED DESCRIPTION OF THE PREFERRED EMBODIMENTS

Figure 4:
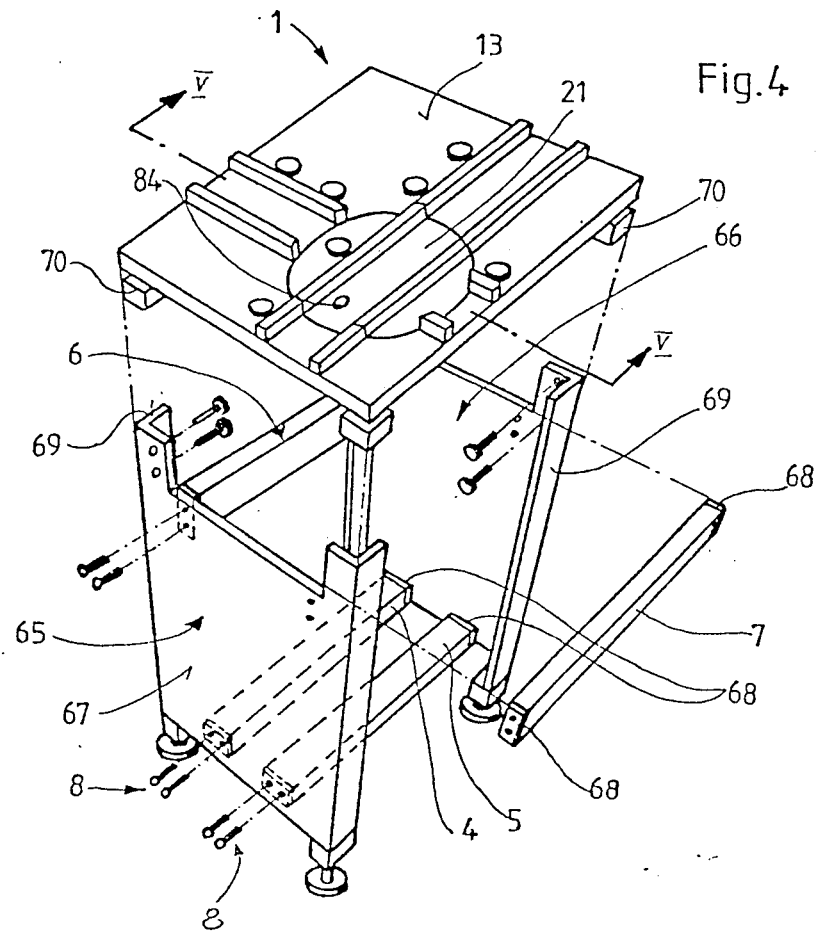
FIG. 4 is a partially exploded view of the machine table of FIG. 1, showing the individual components of the machine table.

A modular machine table 1 intended to be utilised primarily for working stations in automatic assembly lines comprises two plate-shaped support elements 2, 3 interconnected by transverse struts 4, 5, 6, 7 extending horizontally at right angles to the side components 2, 3. Coupling means 8, e.g. screws, are provided for connecting the support elements 2, 3 to the transverse struts 4 to 7. Each plate-shaped support element 2, 3 is of channel-shaped cross-section having flanges 26 and a web 9 the web and flanges defining an upright channel-shaped depression 10 providing space to accommodate parts of the coupling devices 8 which project beyond web 9 so that adjacent machine tables may be placed in direct contact against each other. The upper end faces 11 of the side components 2, 3 are arranged in a plane extending parallel to the struts and are releasably connected to self-supporting table plate 13 by coupling devices 12. Suitably recessed head screws recessed into the table plate 13 are utilised as coupling devices 12.

Two guiding modules 14, 15 for workpiece carriers 16 are situated on the upper side of the table plate 13. Central longitudinal axes 17 of the guiding modules 14, 15 have their point of intersection 18 on a diagonal of the table plate 13. The two guiding modules 14, 15 are installed eccentrically on the table plate 13 and comprise two guiding bars 19 and 20, respectively, which are symmetrically positioned with respect to the central longitudinal axes 17.

A turntable 21 equipped with guiding bar sections 22 is rotatable about point of intersection 18. Drive modules 23 formed by friction roller drives are provided laterally with respect to guiding modules 14, 15, and guiding bar sections 22.

Adjustable supports 25 are mounted at the lower ends of the side components 2, 3 opposite to the upper end faces 11, and adjacent a lower end 24 of the central depression 10. Bores 27 are defined in flanges 26 for connection of juxtaposed machine tables.

Each machine table 28 shown in FIG. 2 comprises a table plate 29 which is fastened on two plate-shaped support elements 31, 32 by means of coupling devices 30. The support elements 31, 32 are of wholly identical construction, so that they may be applied at will for any machine table comprising such support elements. At their upper and lower ends 33, 34 the side components 31, 32 are connected by pairs of transverse struts 35, 36 extending parallel to the table plates 29. The transverse struts 35 and suitably also transverse struts 36 are alike and interchangeable. Four threadedly adjustable supports 37 are provided at opposite sides of the lower ends 34 of the plate-shaped support elements 31, 32. These four supports 37 position the table plate 29 adjustably by screw-displacement of the bearers 37 with respect to the support elements 31, 32. Bores 39 are situated at the upper ends of the support elements, for example close to opposite ends of a central recess 38, for coupling adjacently positioned machine tables. As apparent, the transverse struts 35 are joined to the support element 31, 32 below lower edge 40 of the recess 38. Close to the bottom transverse struts 36, openings 41 are formed in the support elements 31, 32 through which it is possible to lead supply lines and the like between adjacently situated and interconnected machine tables.

As indicated diagrammatically, a guiding module 43 and several feed modules 44 are situated on the upper face side of the table plates 29, each guiding module being formed by a pair of guiding bars 42. In each plate 29 a recess 45 for reception of a positioning module 46 is situated between the guiding bars 42 of the guiding module 43, and a recess 48 for a coding module 49 is situated between one of the guiding bars 42 and a front edge 47 of the plate 29. The arrangement of the positioning module 46 and of the coding module 49 will be described below with reference to FIGS. 10 and 11. Guiding or locating grooves 51 extending in a fixed grid longitudinally and transversely with respect to the guiding bars 42 in the table plate 29 may, for example, be situated between the guiding bar 42 distal from the front edge 47, and a rear edge 50, of the table plate. These guiding grooves 51 may have any desired cross-section, for example in the shape of C-shape or dovetail or the like, so that the fitting or setting up of handling or machining or technical devices, such as screw-cutting mechanisms, rocking rivetting means, presses, punches or the like, on the table plate 29 is facilitated and a stable and precise installation is made possible.

Drive modules 44 are arranged on the forward table 28 on the side of the guide module 43 distal from the forward edge 47. The drive modules 44 are omitted from the rearward machine table to demonstrate that the table plates 29 are formed with a finished pattern of bores for reception of the guiding bars 42 and drive modules 44. The bores 52 arranged one behind another in two straight rows serve for securing the guiding bars 42, whereas the bores 53 serve the purpose of receiving the drive modules 44 and the smaller bores 54 for fastening means for the modules 44. Furthermore, bores 55 may be arranged in a row or mutually staggered in the area of the front edge 47 of the table plate 29 for the purpose of installing or supporting a feed system for parts which are to be assembled. As is shown on the rearward table as an alternative to the guiding grooves 51, the table plate 29 may also have bores 55 arranged in a grid so that complementary apparatus such as handling devices or other technical devices may be positioned and secured on the machine table plate 29.

As apparent, the two machine tables 28 are of wholly identical construction and are set up in a manner such that the rear terminal edges 50 of the plates 29 face each other. In this arrangement, it is possible for example for a continuous guiding device or guiding track for workpiece carriers 16 to be formed by means of the guiding bars 19, 20 of tables 1, and 42 of tables 28, for example if the guiding module of the rear machine table 28 has a guiding module 15 coupled to it, and if the guiding module 43 of the front machine table 28 has a guiding module 14 of the machine table 1 coupled to it, in each case at the ends of guiding modules 14, 15 remote from the turntable 21. The conveying direction for the workpiece carriers 16 would be in the direction of the arrows 56 in the set up of the machine tables 28 illustrated. If it is desirable to have an opposed conveying direction in a circulatory system for workpiece carriers 16 as denoted by broken lines, it is merely necessary to turn the table plates over, i.e. to pivot the same around a central axis 57 intersecting the edges 47, 50. The surface 58 of the table plate 29 forming the underside is thereby changed into the upper side, whereas the surface 59 forming the upper side is changed into the underside of the table plate. Either optional application of the table plate 29 is possible without additional operations because both surfaces 58, 59 have an identical surface pattern, bores and depressions for the coupling devices which do not project beyond the surface 58 and 59. A universal application and economical production of such machine tables is thereby possible, so that these may be series produced in larger quantities since they are very versatile and adaptable to the most varied conditions of utilisation.

A machine table 60 for a manual working station which is assembled from the same individual parts as the machine tables 28, is shown in FIG. 3. Identical reference numerals are consequently utilised for identical parts. It is desirable that an operative be provided with sufficient working space at the manual working station and a correspondingly greater stowage space for workpiece carriers 16 to be coupled to or decoupled from the feed path, the carriers 16 operating in a loose concatenation in any event by virtue of the structure of the feed modules. The machine table 60 therefore, incorporates two table plates 29 arranged one right behind the other in the guide paths. The guiding bars 42 of the guiding modules and the drive modules 44 already described with reference to FIG. 2 are situated on the two table plates. The distal ends of the two table plates 29 are supported in the manner described with reference to FIG. 2 by means of plate-shaped support elements 31, 32 which are suitably produced as cut lengths from a preformed sheet metal section. To provide appropriate legroom for an operative, transverse struts 61, 62 are situated only in the area of the rear edge of the table plates 29. A bearing strut 63 connecting the transverse struts 61, 62 on which the proximal edges of the table plate 29 bear, is provided to support the table plates 29 at their facing end. In the area of the front edge 47 of the table plates 29 facing the operative, the facing table ends are connected by coupling bars 64. These coupling bars 64 are preferably located is registry with the guiding bars 42 but situated on the underside of the table plate 29, so that the bores 52 provided for fastening the guiding bars 42 may also be used for fastening the coupling bars 64 by use of commensurately longer securing means for the guiding bars and the coupling bars 64.

Figure 5:
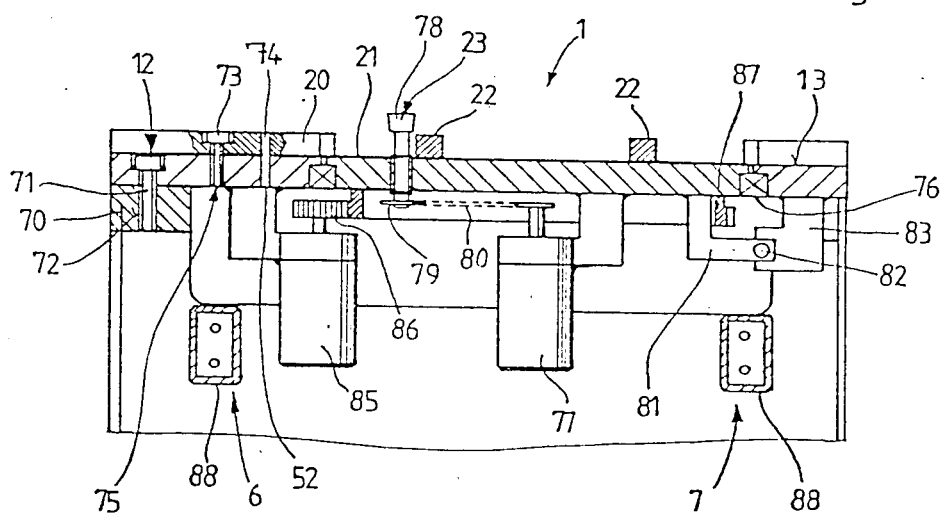
FIG. 5 is a fragmentary section taken on the line V—V of FIG. 4 and showing the arrangement of the turntable.
Figure 8:
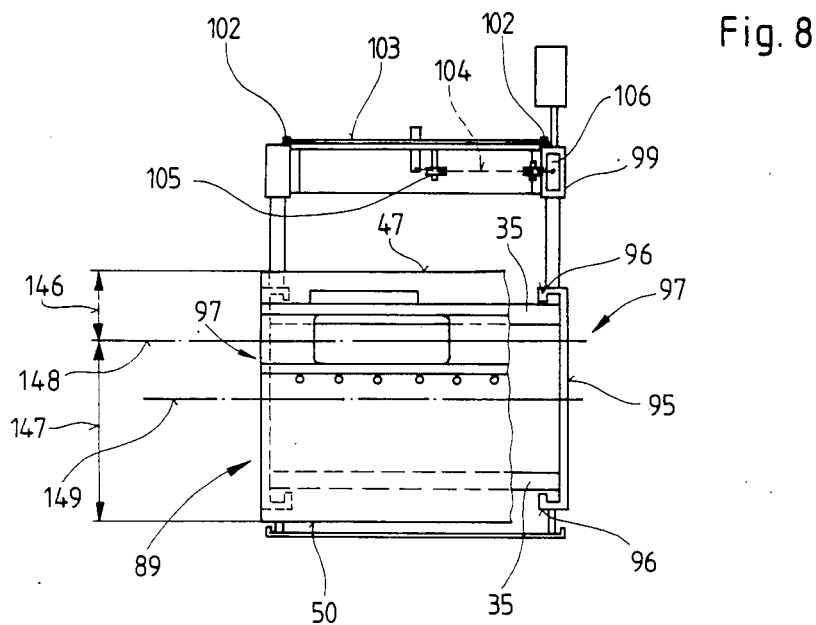
FIG. 8 is a plan view of the machine table of FIG. 6.

The individual parts and structural details of a modified machine table 1 are illustrated in FIGS. 4 and 5, in which the same reference numerals as in FIG. 1 are utilised for identical parts. As compared to the illustration in FIG. 1, the machine table 1 in FIG. 4 comprises channel-section support elements 65, 66 whereof the web 67 is a plane plate, compared with the centrally recessed webs of the support elements 2, 3 of the table of FIG. 1.

As apparent from FIG. 4, the transverse struts 4-7 are connected by means of two screws which form the coupling devices 8 between the support elements 65, 66 and the transverse struts 4-7. To secure an untwistable mounting of the transverse struts 4-7, and consequently a torsionally rigid structure of the machine table 1 constructed in the manner of a housing, anchoring members 68 are situated at the ends of the transverse struts 4-7 which, as seen for the struts 6, 7 in FIG. 5, are formed by hollow sections 88 for reinforcement of the machine table 1. These anchoring members securely fix the coupling devices 8 and thus provide a transverse reinforcement of the machine table 1.

The channel section of plate-shaped support elements 65, 66 makes them more rigid, another reinforcement being provided in the region of transition between the web 67 and the flanges 69 by anchoring plates 70 for precise mounting and securing of the table plate 13.

As apparent from FIG. 5, the coupling devices 12 for the table plate 13 are formed by bolts 71 arranged with their heads recessed in recesses formed in the table plate 13, which are screwed into screw-threads 72 in the anchoring plate 70. It is also possible to make use of throughbolts and to tighten the clamping bolt couplings to a predetermined torque, so that a secure and rigid joint between the support elements 65, 66 and the table plate 13 is assured.

As additionally apparent from FIG. 5, the guiding bars 19 and 20, as well as the guiding bar sections 22, are fastened on the machine plate 13 and the turntable 21 respectively, by means of coupling devices formed by screwbolts 73 and set pins 74. The bores 52 for the set pins 74 and the screw-threads 75 for the screwbolts 73 are preformed in the table plate 13 during its production. The guiding bars 19, 20 and the guiding bar sections 22 are provided with appropriate counterbores so that the heads of the screwbolts are recessed below their upper surfaces.

The turntable 21 is rotatably journalled in a roller bearing 76 which is preferably pressed into the machine plate 13, and carries the guiding bar sections 22 as well as drive modules 23. The drive modules 23, are driven in rotation by means of a rotary drive 77. The drive of the drive modules 23, which is suitably constructed in accordance with DE-OS 33 04 091 and DE-OS 27 66 422, comprises a rotating conveying roller 78 which is driven in rotation by a sprocket 79 by means of a chain 80 connected to the sprocket of the rotary drive 77.

The turntable 21 has on its underside a stop 81 provided with a shock absorber 82 which has a movable part coordinated with a mating stop 83 adjustably mounted on the machine table plate 13. The position of the workpiece carrier on the turntable 21 is monitored by means of a limit switch 84 as apparent from FIG. 4. The switch 84 is interlinked with a control device for the machine table 1, in a manner such that when the limit switch position is reached by a workpiece carrier 16, the rotary drive 77 is stopped. It is only after the turntable 21 has been displaced by means of a rotary drive 85 whereof the pinion 86 cooperates with a ring gear 87 arranged on the turntable 21 into a terminal position determined by a mating stop 83, that the rotary drive 77 is re-energised and the workpiece carrier is driven into the path of the next guiding module.

Figure 9:
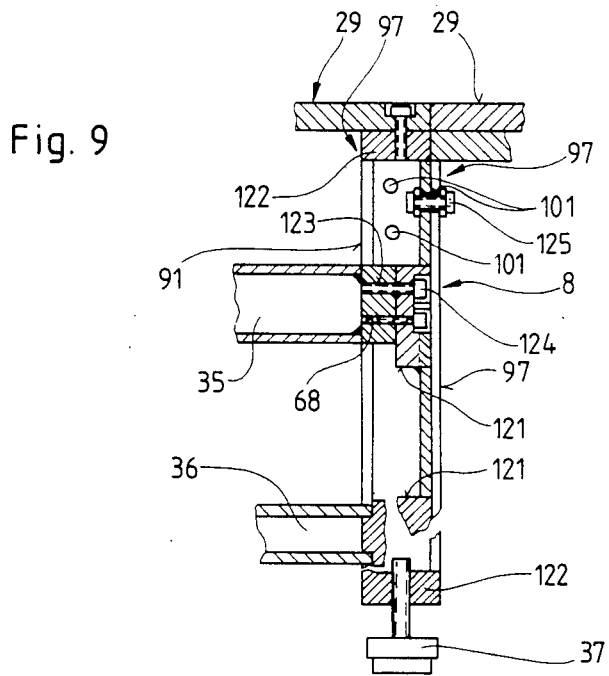
FIG. 9 is a fragmentary section taken on line IX—IX of FIG. 6 showing joints between a plate-shaped support element with the table plate and transverse struts.

A machine table 89 comprising an accident prevention or safety module 90, an installation module 91 and a verification or monitoring module 92, is shown in FIGS. 6 to 9. The machine table 89 is formed substantially in accordance with the machine table 28 in FIG. 2, and corresponding reference numerals are utilised for identical parts. The advantages of the simplified arrangement of the accident prevention and installation and verification and monitoring modules 90 to 92 will now be described with reference to these Figures. It is apparent from the drawings, particularly FIG. 8, that the rear edge 50 and side edges 93, 94 of the table plate extend flush with the webs 95 and the flanges 96 of the channel-shaped support elements 97. This allows consecutively positioned machine tables 89 to be placed in direct contact and mounting the installation module 91 in an uncomplicated manner. As already described with reference to FIG. 2, the table plate 29 has arranged on it the guiding bars 42 of the guiding module 43 which, as described with reference to the guiding bars 20 in FIG. 5, are fastened on the table plate 29. The feed modules 44 are coupled to a rotary drive 77 mounted on the table plate 29, via a chain 80, and are jointly driven by the same. Upright columns 99 formed by hollow sections are installed at a distance forwardly from the front edge 47 of the table plate 29 by means of brackets or cantilevers 98. By this uncomplicated connection of the columns 99 of the safety module 90 it is possible to make allowance for the prevailing requirements, such as the movement of handling devices for extraction of parts from feed devices. As more clearly apparent from FIG. 7, the cantilevers 98 formed by hollow sections have reinforcements at their ends, into which are screwed releasable coupling elements 100 through bores 101 formed in the flanges 96 for this purpose as shown in FIGS. 2 and 9. The connection between the cantilevers 98 and the columns 99 is similarly and advantageously established by releasable coupling elements, so that these parts may be dismantled and transported or stored in the disassembled state. Upright guiding bars 102 are situated on the sides of the columns 99 which face away from the machine table 89. A protective safety plate 103, formed advantageously from transparent plastics material is displaceably installed in these upright guiding bars 102 and is joined by a cable pull 104 and deflecting pulleys 105 to counterweights 106 which are situated within the hollow sections of the columns 99. The weight of the protective safety plate 103 is a little greater than the weight of the counterweights 106 running in the columns 99, so that the protective safety plate always tends to assume a lower closed position. In this closed position, the bottom edge 107 of the plate 103 operates a limit swtich 108 which is connected to control elements situated within a verification and monitoring module 92 in a manner such that all motions within the machine table 89 are stopped by means of an "emergency stop" safety circuit when the protective safety plate 103 is lifted from its closed position. Mechanical or pressure-fluid-operated detent means, or pawls, or the like, are suitably provided releasably to secure the protective safety plate in a raised position.

The upper ends of the columns 99 facing away from the machine table 89 are suitably provided with an installation channel 109 wherein may be arranged the control lines and hoses connecting the verification and monitoring modules 92 of the individual machine tables 89. With appropriate application of hollow sections for the fastening of the verification and monitoring modules 92 on the columns 99, the cables or wires may be led through the cavities of these sections to terminals in the verification and monitoring module 92.

At their upper portions below the installation channel 109, the columns 99 are connected by transverse beams 110 to a rear plate 111 of the installation module 91. This rear plate 111 has a lower portion distal from the transverse beams 110 bolted to the flanges 96 of the support elements 97. As more clearly apparent from FIG. 7, the rear plate 111 is suitably equipped with bores 112 arranged in a grid for reception of diagrammatically indicated control and monitoring elements 114, e.g. a compressed air service unit. Even if the bores 112 of the pattern of holes do not correspond to the fastening bores of the control and monitoring elements, it is possible to secure these on the rear plate 111 by means of standard or prefabricated mounting plates 114 in an uncomplicated manner. As denoted additionally in FIG. 6, it is possible to secure additional plates 115, analogous to rear plate 111, on the transverse beams 110, to meet prevailing requirements. The fastening of the transverse beams 110 to the rear plate 111 and the columns 99 is effected by releasable coupling means and interpositioned reinforcing plates, analogously to the fastening of the cantilevers 98 or of the transverse struts 35, 36. The part of the machine table 89 extending downwards from the bottom edge 107 of the protective safety plate 103 is covered by safety plates 116, 117. To this end, the safety plates 116 are secured on brackets 119 by means of quick-release connectors 118, e.g. a snap-lock fastener or the like. The bottom safety plates 117 are hung in Vee-shaped grooves open towards the bottom edge 107 and are bolted fast to the flanges 96 in the slots 120. Thanks to this division of the safety plate into the upper protective safety plate 103, the intermediate safety plate 116 and the lower safety plate 117, an optimum access to the machine tables 89 fulfilling the requirements in a production plant is assured with maximum reliability. This is because a rapid access is assured in the upper portions in which most failures occur in accordance with experience, for example in handling devices or feed apparatus, by means of the counterbalanced protective safety plate 103, and because access is assured rapidly to a large extent even in the area of the workpiece carriers by means of the intermediate safety plate 116 and of the rapid connectors 118.

As apparent from the drawings, machine tables 89 can be advantageously equipped with installation and accident prevention modules to obtain rigid machine tables of lightweight construction with but few components.

FIG. 9 shows the connection between two machine tables 89 as well as the connection of the transverse struts 35, 36 to the support elements 97 by support members 121 installed on the side components 97, as well as the anchoring plates 122. The of the table plate 29 to the support elements 97 by anchoring support members 121 are welded on to the support elements 97 which are produced from precut preformed channel-shaped sheet metal sections. The bores for reception of the coupling devices 8 between the support elements 97 and the transverse struts 35, 36 are produced after the welding-on of the support members 121. The anchoring parts 68 welded to the end sides of the hollow sections forming the transverse struts are equipped with internal screw-threads 123 in alignment with the bores in the support member 121. The bolting of the support elements 97 to the transverse struts 35 by means of recessed head bolts 124 establishes a massive node, and a reinforcement of these principal bearing members of the machine table is obtained above all by the incorporation of two support members 121 extending in parallel in the upper and lower portions of the support elements 97. At the same time, it is assured by recessing the bolt heads of the bolts 124 that adjacently situated machine tables may be placed in contact and joined together without a gap. The through-bolts 125 are inserted in the bores 101 made in the webs to connect these machine tables, and tightened to a predetermined torque after aligning the directly contiguous machine tables. This assures a smooth transition between the table plates 29 of adjacently situated machine tables. The same also applies to the guiding bars 42 placed on the table plates 29 after installing the machine tables. These are mounted by means of the prepared bores, for example by means of the internal M6 screw-threads provided in the former.

In view of the reinforcement of the lower ends oppositely situated to the table plate 29 in the transition between the web 95 and the flanges 96 of the side components 97, a satisfactory stability is assured by the reliable anchoring of the supports 37 in the anchoring plates 122, and since the guiding length of the supports 37 equipped with a screw-threaded rod is determined by the thickness of the anchoring plates 122 and by the length of the screw-thread provided therein and the arrangement may easily be adapted to different load conditions.

Figure 10:
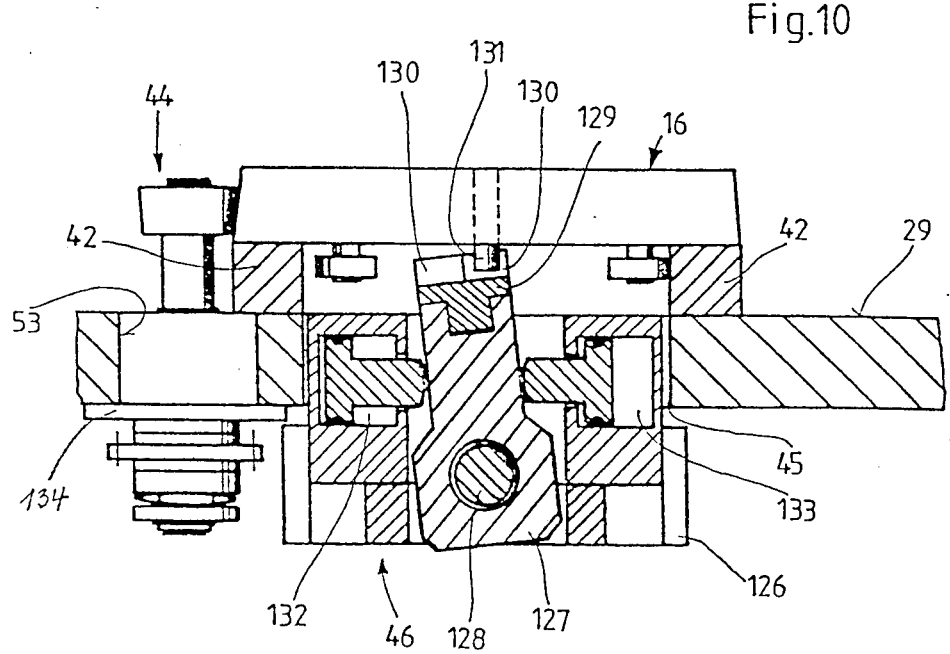
FIG. 10 is a fragmentary cross-section taken transversely of a guide module showing a positioning module situated in a table plate of a machine table.

The arrangement of the positioning module 46 situated in the recess 45 of FIG. 2 is shown in FIG. 10. The positioning module 46 comprises a housing 126 wherein is installed a rocking lever 127 displaceable, at its upper end, transversely of the guiding bars 42. The rocking lever 127 is pivotally mounted, at its lower end, on a shaft 128 extending parallel to the guiding bars 42 and journalled in housing 126. A stop carrier plate 129 is adjustably arranged in the longitudinal direction of the guiding bars 42 on the upper extremity of the rocking lever 127 remote from the shaft 128. Replaceable inserts which act as stops 130 are situated on the stop carrier plate 129. These stops 130 cooperate with a positioning stud 131 situated on the underside of workpiece carrier 16. The stops 130 situated in the left-hand and right-hand halves, respectively, of the stop carrier plate 129 may alternately be placed in engagement with the positioning stud 131 by pivoting the rocking lever 128 by means of two piston-cylinder systems 132, 133 arranged in the housing 126. The workpiece carrier 16 may thereby be immobilised at a processing station, in several positions along the length of the stop carrier plate, for example so that several workpieces placed one behind another on the workpiece carrier 16 may be centered in the area of a processing or handling system. An advantageous arrangement of the positioning module 46 is thereby obtained without obstructing the important space on the surface of the table plate 29.

At the same time, it is apparent from FIG. 10 that the drive modules 44 comprise guiding sleeves 134 with which they are inserted in the bores 53 formed in the table plate. This also assures a rapid and easy installing as well as replacement of the drive modules 44.

Figure 11:
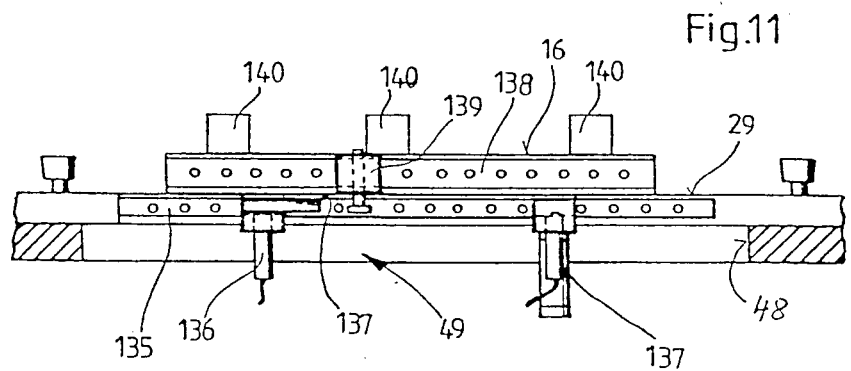
FIG. 11 is a fragmentary cross-section taken longitudinally of the guiding module on a table plate showing an arrangement of a coding module.

The arrangement of a coding module 49 in the area of the recess 48 of FIG. 2 is shown more clearly in FIG. 11. Scanning devices 136 and displacing devices 137 are installed in a bar 135 having longitudinally spaced perforations. The scanning and displacing devices 136, 137 are associated with a symbol carrier 139 secured in a selectible position on a perforated bar 138 situated on the workpiece carrier 16. In view of the universal displaceability of the scanning or displacing devices 136, 137 of the symbol carrier 139, it is possible to establish any optional position within the processing space, at which the symbol carrier 139 is to be scanned or displaced. Different machining positions of a workpiece carrier receiving several workpieces 140 may thereby also be determined. Thanks to the recess 48, the scanning and displacing devices 136 and 137 extend in the space beneath the table plate and access to the workpiece carriers or the handling devices or other devices on the table plate 29 is not obstructed thereby.

As depicted in FIG. 1, a distance 141 between a rear lateral edge 142 of the table plate 13 and the central longitudinal axis 17 of the guiding modules 14, 15 is greater than a distance 143 between a front edge 144 and the central longitudinal axis 17. This establishes an eccentric position of the guiding modules 14, 15 with respect to a central longitudinal axis 145 of the table plate 13. The central longitudinal axis 17 of the guiding module 14 is analogously spaced apart from the edge facing towards the support element 2, by a distance 143. This allows the machine tables 1 to be assembled at will in an identical but oppositely directed form to establish a space between two guiding modules extending parallel to each other. Since the distances 146, 147 between a central longitudinal axis 148 of the support element 97 and edges 47 and 50 of the machine table 89 and also of the machine tables 28 are moreover smaller by an identical quantity than the corresponding distances 143 and 141, equal distances are present between the central longitudinal axis 145 of the table plates 13 and 29 respectively, and the central longitudinal axes 17 and 148 respectively of the guiding modules 14, 15 and 43, respectively. Central coupling of the machine tables 1 and 89, is rendered possible in this manner. A narrow-gap back-to-back arrangement of the analogously constructed machine tables 28 is also rendered possible thereby and a universal application of the table plates 13 is secured for such machine tables comprising turntables, so that it is possible to form closed circulatory systems from guiding modules of several machine tables with appropriate "sidings" and the like, merely by utilising two different kinds of table plates.

It is advantageous furthermore that thanks to appropriate dimensions of the table plates 13, 29 for the different machine tables, it is possible in each case to make use of analogously constructed structural elements and transverse struts, thereby substantially reducing the costs of production and storage of spare parts.

I claim:

1. A modular machine table for a production plant, comprising
   (a) two vertically extending plate-shaped support elements having upper end faces extending in a horizontal plane,
      (1) the plate-shaped support elements being comprised of a web and two end flanges defining a vertically extending recess to impart a channel-shaped cross section to the support elements,
   (b) a plurality of transverse struts interconnecting the two support elements in at least two horizontal planes extending parallel to the plane wherein the end faces of the support elements extend,
   (c) a self-supporting table plate supported on, and connected to, the end faces of the support elements, (d) releasable coupling devices connecting the transverse struts and the table plate to the support elements, and for connecting adjacent ones of the machine tables to each other, and (e) the web having bores receiving the releasable coupling devices for connecting the transverse struts to the support elements and the flanges having bores receiving the releasable coupling devices for connecting the adjacent machine tables to each other, the bores being positioned symmetrically with respect to a vertical center line of the web.

2. The modular machine table of claim 1, further comprising anchoring corner plates at upper and lower ends of the plate-shaped support elements in alignment with the flanges and abutting portions of the web, the anchoring corner plates having bores extending parallel to the vertical center line for respectively receiving adjustable supports at the lower ends and the releasable coupling devices for connecting the table plate to the support elements.

3. The modular machine table of claim 1, wherein the transverse struts are hollow, further comprising anchoring members arranged in opposite ends of the hollow struts, the anchoring members registering with the bores in the webs and receiving the releasable coupling devices for connecting the struts to the support elements.

4. The modular machine table of claim 1, further comprising a safety module including two vertical columns and safety plate means supported by the vertical columns for protecting the machine table and designed to aid in the prevention of accidents, cantilevers connecting the columns to the flanges at a front of the machine table and the flanges having bores receiving releasable coupling devices for connecting the cantilevers thereto.

5. The modular machine table of claim 4, wherein the vertical columns have upper ends situated above the table plate, and the cantilevers connect lower ends of the columns to the flanges at the machine table front, and comprising a vertical rear plate having a lower end connected to the flanges at a rear of the machine table and having an upper end situated above the table plate, and transverse beams interconnecting the upper ends of the columns to the upper end of the rear plate.

6. The modular machine table of claim 5, wherein the safety plate means comprises a transparent safety plate having a bottom edge, the vertical columns are hollow and have longitudinally extending guide tracks receiving the safety plate for displacement therealong, and further comprising two pulling cables having one end attached to the safety plate, counterweights attached to ends of the cables opposite to the one cable end and pulleys between the cable ends over which the cables are trained, the counterweights being arranged inside the hollow columns, and limit switches arranged in the displacement path of the safety plate for engagement therewith when the safety plate is in its lowermost position.

7. The modular machine table of claim 6, wherein the safety plate means including additional safety plates arranged in a gap between the bottom edge of the transparent safety plate and transverse struts extending in one of the horizontal planes near lower ends of the plate-shaped support elements, and further comprising quick-release fasteners for securing the additional safety plates.

8. The modular machine table of claim 5, further comprising a plurality of mounting plates carried by the transverse beams between the columns and the rear plate, the rear and mounting plates having a grid of bores for receiving control and monitoring elements.

9. The modular machine table of claim 1, wherein the vertically extending recesses of the two plate-shaped support elements face each other and accommodate protruding parts of the coupling devices connecting the transverse struts to the support elements.

* * * * *